(12) United States Patent
Pentek et al.

(10) Patent No.: US 8,318,031 B2
(45) Date of Patent: Nov. 27, 2012

(54) METHOD FOR MANUFACTURING A PERPENDICULAR MAGNETIC WRITE HEAD HAVING A TAPERED WRITE POLE

(75) Inventors: Aron Pentek, San Jose, CA (US); Thomas J. A. Roucoux, San Jose, CA (US); Yi Zheng, San Ramon, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 392 days.

(21) Appl. No.: 12/748,182

(22) Filed: Mar. 26, 2010

(65) Prior Publication Data

US 2011/0233167 A1 Sep. 29, 2011

(51) Int. Cl.
*B44C 1/22* (2006.01)

(52) U.S. Cl. ............... 216/22; 216/37; 216/67; 360/122; 360/125.42; 360/125.46; 360/125.51; 360/125.64

(58) Field of Classification Search ............ 216/22, 216/37, 67; 360/122, 125.42, 125.46, 125.51, 360/125.59, 125.64
See application file for complete search history.

(56) References Cited

U.S. PATENT DOCUMENTS

| | | | |
|---|---|---|---|
| 6,693,768 B1 | 2/2004 | Crue et al. | 360/126 |
| 6,710,973 B2 | 3/2004 | Okada et al. | 360/125 |
| 7,159,302 B2 | 1/2007 | Feldbaum et al. | 29/603.12 |
| 7,221,538 B2 | 5/2007 | Kawato et al. | 360/126 |
| 7,251,878 B2 | 8/2007 | Le et al. | 29/603.16 |
| 7,375,925 B2 | 5/2008 | Sasaki et al. | 360/126 |
| 7,417,824 B2 | 8/2008 | Kameda | 360/125.02 |
| 2007/0139818 A1 | 6/2007 | Shimazawa et al. | 360/126 |
| 2008/0088972 A1 | 4/2008 | Sasaki et al. | 360/110 |
| 2008/0239567 A1 | 10/2008 | Sasaki et al. | 360/111 |
| 2008/0271308 A1* | 11/2008 | Hsiao et al. | 29/603.16 |
| 2009/0122445 A1* | 5/2009 | Jiang et al. | 360/123.12 |
| 2009/0162699 A1 | 6/2009 | Sasaki et al. | 428/812 |
| 2009/0279207 A1 | 11/2009 | Sasaki et al. | 360/125.03 |
| 2009/0296275 A1* | 12/2009 | Sasaki et al. | 360/125.3 |
| 2011/0147222 A1* | 6/2011 | Pentek et al. | 205/170 |

FOREIGN PATENT DOCUMENTS

JP 2009181641 8/2009

* cited by examiner

*Primary Examiner* — Nadine Norton
*Assistant Examiner* — Maki Angadi
(74) *Attorney, Agent, or Firm* — Zilka-Kotab, PC

(57) ABSTRACT

A method for manufacturing a magnetic write head having a write pole with a tapered leading edge and a tapered trailing edge. The method includes forming a non-magnetic bump player over a surface, forming a mask over the non-magnetic bump layer and performing a first ion milling to form a tapered back edge on the non-magnetic bump layer. A magnetic write pole material is then deposited over the surface and over the non-magnetic bump layer. Then a non-magnetic step structure is formed over the magnetic write pole material and an ion milling is performed to form a taper on the upper surface of the write pole. The write pole lateral dimensions can then be defined, and a non-magnetic bump formed over the tapered portion of the upper surface of the write pole. Another ion milling can then be performed to extend the taper of the surface of the write pole.

20 Claims, 26 Drawing Sheets

METHOD FOR MANUFACTURING A PERPENDICULAR MAGNETIC WRITE HEAD HAVING A TAPERED WRITE POLE

FIELD OF THE INVENTION

The present invention relates to magnetic heads for data recording, and more particularly to a method for manufacturing a perpendicular magnetic write head having a tapered write pole, an additional magnetic layer over the write pole and a non-magnetic bump for optimal trailing shield spacing.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head has traditionally included a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs, a GMR or TMR sensor has been employed for sensing magnetic fields from the rotating magnetic disk. The sensor includes a nonmagnetic conductive layer, or barrier layer, sandwiched between first and second ferromagnetic layers, referred to as a pinned layer and a free layer. First and second leads are connected to the sensor for conducting a sense current there-through. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos $\Theta$, where $\Theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

In a perpendicular magnetic recording system, it is desirable to maximize write field strength and also maximize field gradient. A strong write field ensures that a magnetic bit can be recorded in the magnetically hard top layer of the magnetic medium. A high field gradient allows for fast magnetic switching of the magnetic field from the write pole, thereby increasing the speed with which the magnetic transitions can be recorded. It is desirable to maximize both of these parameters, while also ensuring that the magnetic write pole does not become magnetically saturated at the pole tip.

SUMMARY OF THE INVENTION

The present invention provides a method for manufacturing a magnetic write head having a write pole with a tapered leading edge and a tapered trailing edge. The method includes forming a non-magnetic bump layer over a surface, forming a mask over the non-magnetic bump layer and performing a first ion milling to form a tapered back edge on the non-magnetic bump layer. A magnetic write pole material is then deposited over the surface and over the non-magnetic bump layer. Then, a non-magnetic step structure is formed over the magnetic write pole material and an ion milling is performed to form a taper on the upper surface of the write pole.

The write pole lateral dimensions can then be defined, and a non-magnetic bump formed over the tapered portion of the upper surface of the write pole. Another ion milling can then be performed to extend the taper of the surface of the write pole.

The process for manufacturing such a write pole advantageously eliminates the need to planarize the magnetic write pole layer. This saves a great deal of additional processing time and expense, thereby reducing cost and improving throughput.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
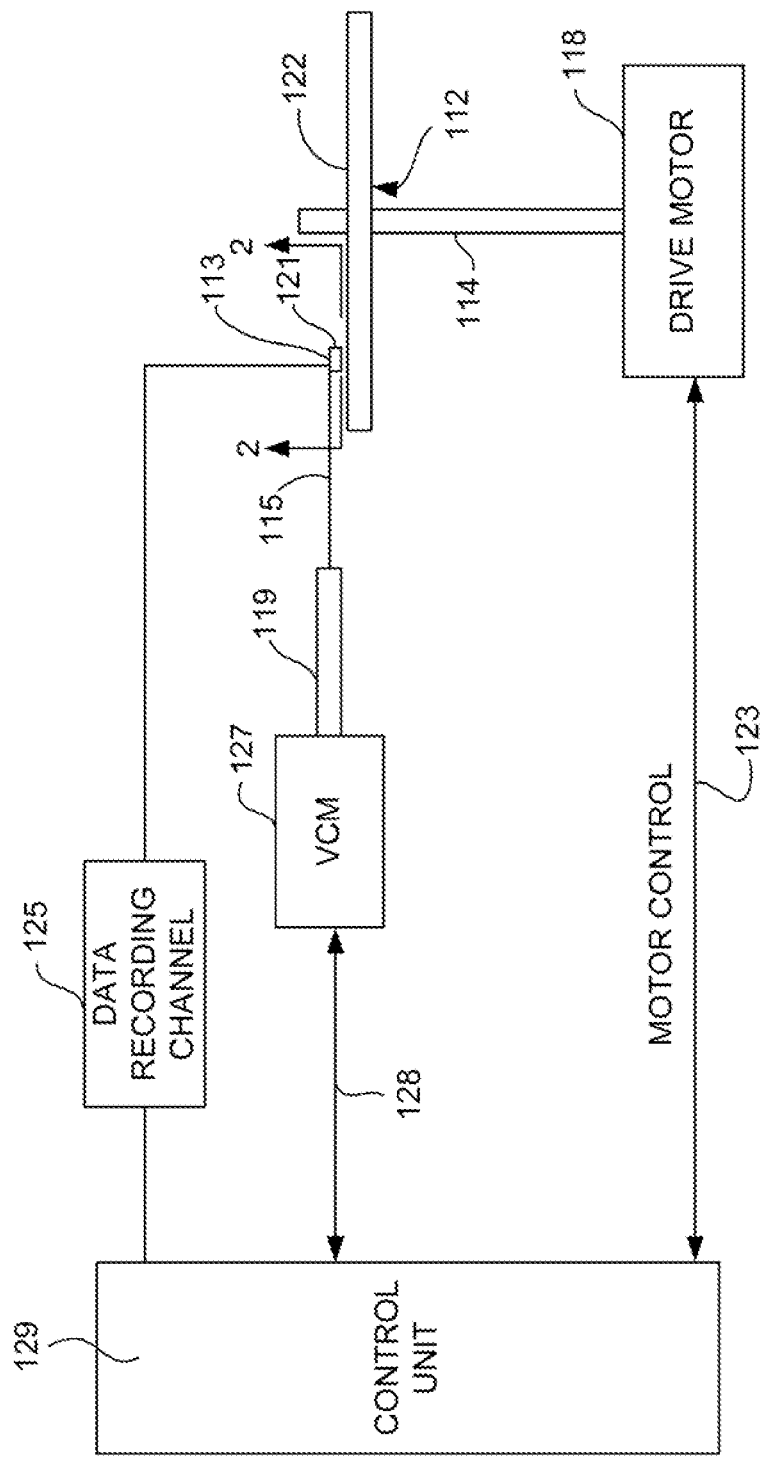
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, the slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
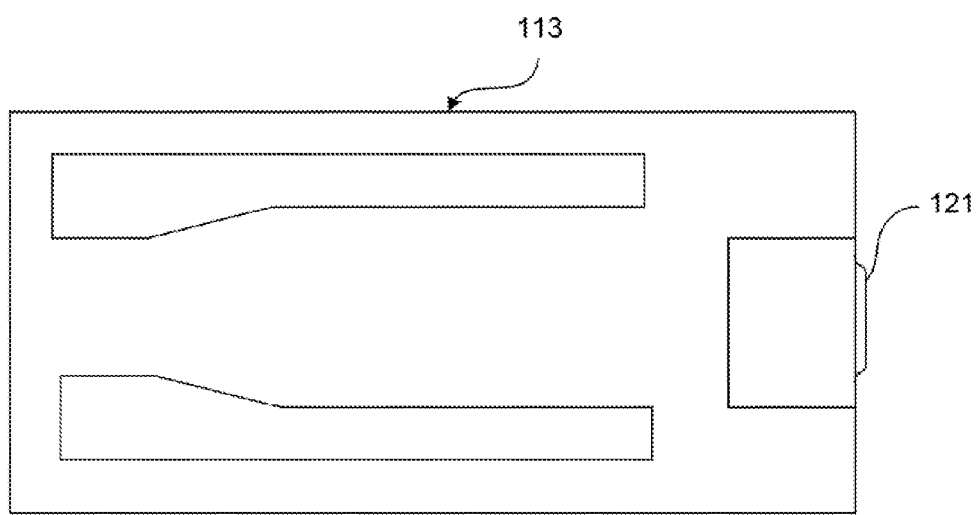
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
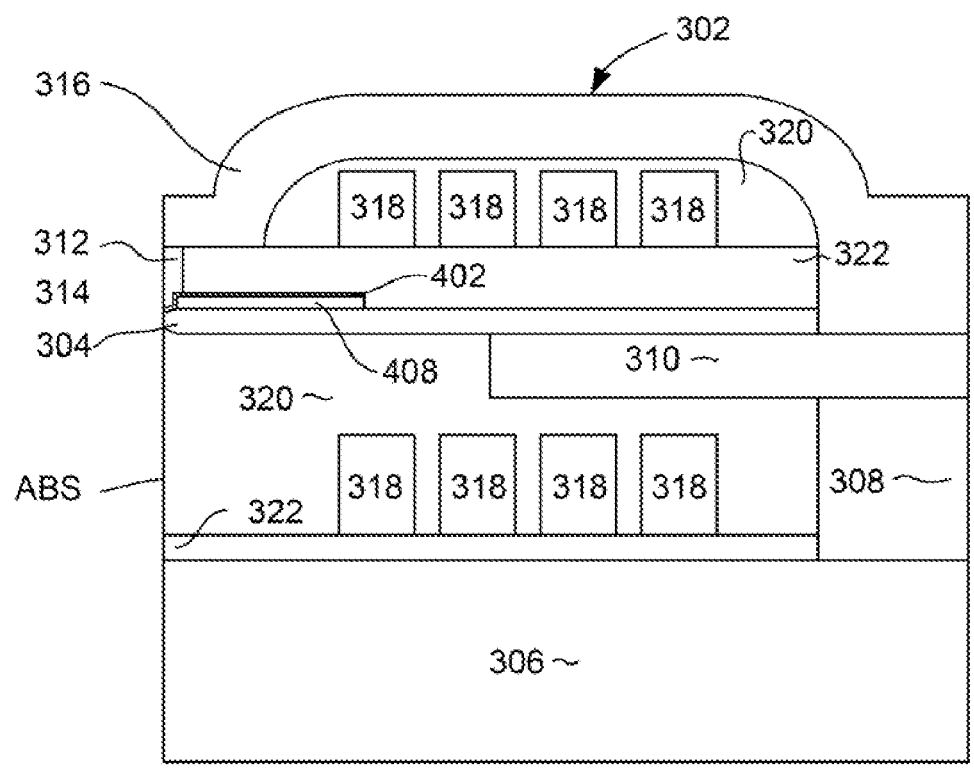
FIG. 3 is a cross sectional view of a magnetic write head according to an embodiment of the present invention.

With reference now to FIG. 3, the invention can be embodied in a magnetic head 302 having a tapered write pole and a non-magnetic bump. The magnetic write head 302 includes a magnetic write pole 304 and a magnetic return pole 306. A magnetic back gap layer 308 and magnetic shaping layer 310 magnetically connect the return pole 306 with the write pole 304 at a location removed from an air bearing surface (ABS).

An electrically conductive, non-magnetic write coil 318 passes between the write pole 304 and return pole 306 and may also pass above the write pole 304. The write coil 318 can sit on top of a non-magnetic, electrically insulating material 322 and is also embedded in a non-magnetic, electrically insulating material 320 such as alumina and or hard baked photoresist.

During operation, an electrical current flowing through the coil 318 induces a magnetic field that results in a magnetic flux flowing through the write pole 304. This causes a magnetic field to be emitted from the write pole 304 toward a magnetic medium such as the magnetic medium 122 shown in FIG. 1. This magnetic write field flows through the medium to return to the return pole 306 which has a sufficiently large cross section that it does not erase the magnetic bit written by the write pole 304.

In order to increase the write field gradient (and thereby increase switching speed), the write head 302 also includes a magnetic trailing shield 312. This trailing shield 312 is separated from the write pole 304 by a non-magnetic trailing gap layer 402. The write pole 312 may also be connected with a trailing return pole 316 that connects the trailing shield 312 with the back portion of the write head 302, such as the back portion of the shaping layer 310.

Figure 4:
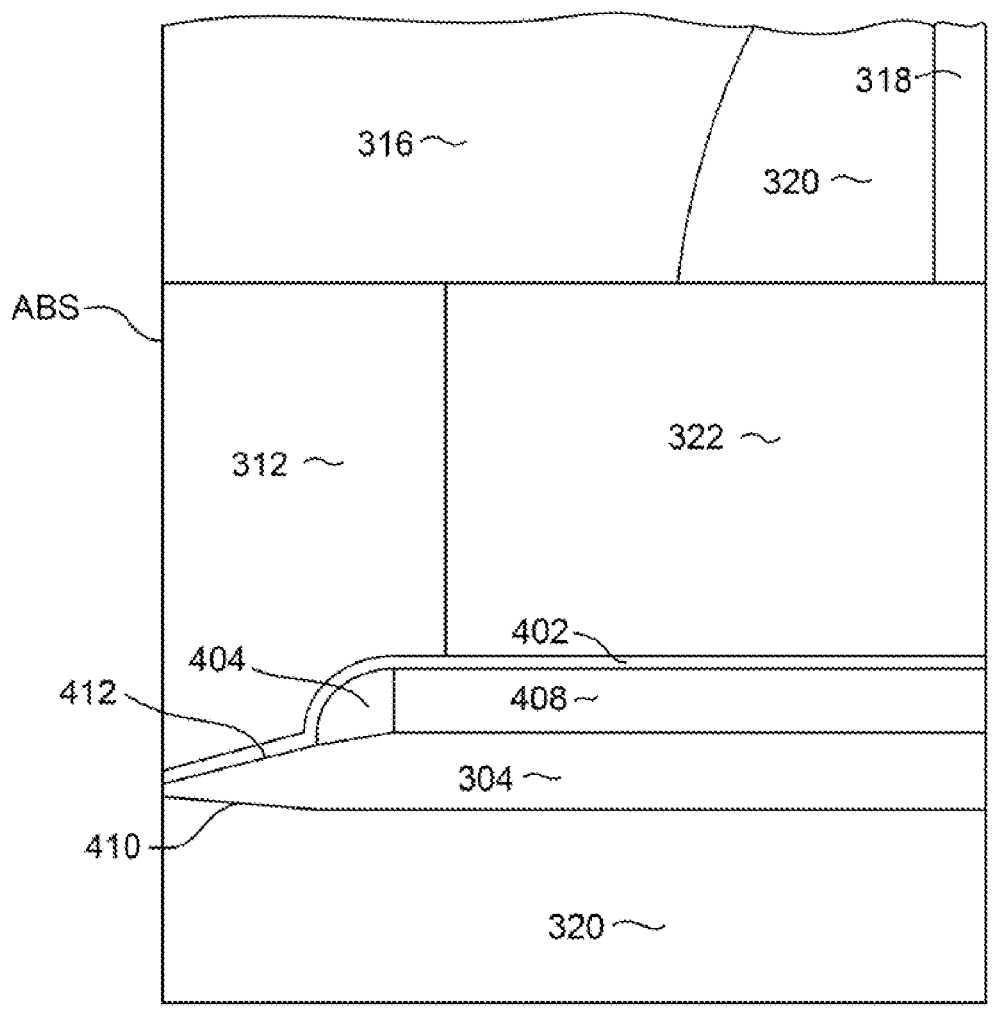
FIG. 4 is an enlarged view of a pole tip region of the magnetic recording head of FIG. 3.

FIG. 4 shows the pole tip region of the write head 302 enlarged and in greater detail. A non-magnetic spacer layer 408 is provides at the top of the write pole 304, the non-magnetic spacer 408 being recessed from the ABS. This non-magnetic space layer can be constructed of a material such as SiC, NiCr, or Ru and can have a thickness of about 60 nm or 40-80 nm. The spacer layer 408 provides a desirable additional spacing between the write pole 304 and the trailing shield 312 in a region removed from the ABS in order to prevent the leakage of magnetic write field to the shield 312. In addition, a non-magnetic bump layer 404 is formed at the front of the spacer layer 408 to further optimize the spacing of the trailing shield from the write pole 304.

As can be seen, the write pole 304 has a tapered leading edge 410 and a tapered trailing edge 412, both of which act together to channel magnetic flux to the tip of the write pole, while avoiding magnetic saturation of the write pole. This unique taper can be constructed by a process that will be described herein below.

Figure 5:
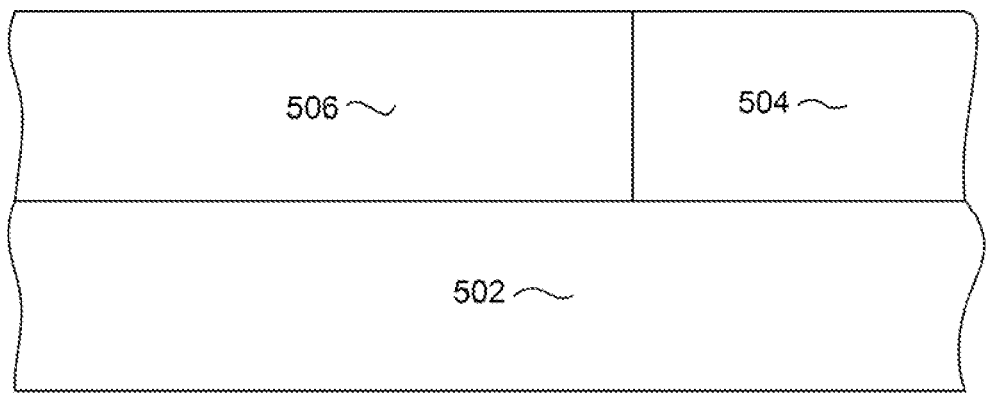
FIGS. 5-26 are views of a portion of a write pole in various intermediate stages of manufacture, illustrating a method for manufacturing a magnetic write head according to an embodiment of the invention.

FIGS. 5-26 illustrate a method for manufacturing a write head according to an embodiment of the invention, such as that described above with reference to FIGS. 3 and 4 above. With particular reference to FIG. 5, a substrate 502 is provided, which can be a non-magnetic fill layer such as alumina. A magnetic structure 504 is formed over the substrate 502, the magnetic structure 504 corresponding to the shaping layer 510 described above with reference to FIG. 3. A non-magnetic fill layer 506 such as alumina is formed over the substrate and planarized to be co-planar with the magnetic structure 504. Both the non-magnetic fill layer 506 and the substrate 502 together can correspond with the till layer 320 described above with reference to FIG. 3.

Figure 6:
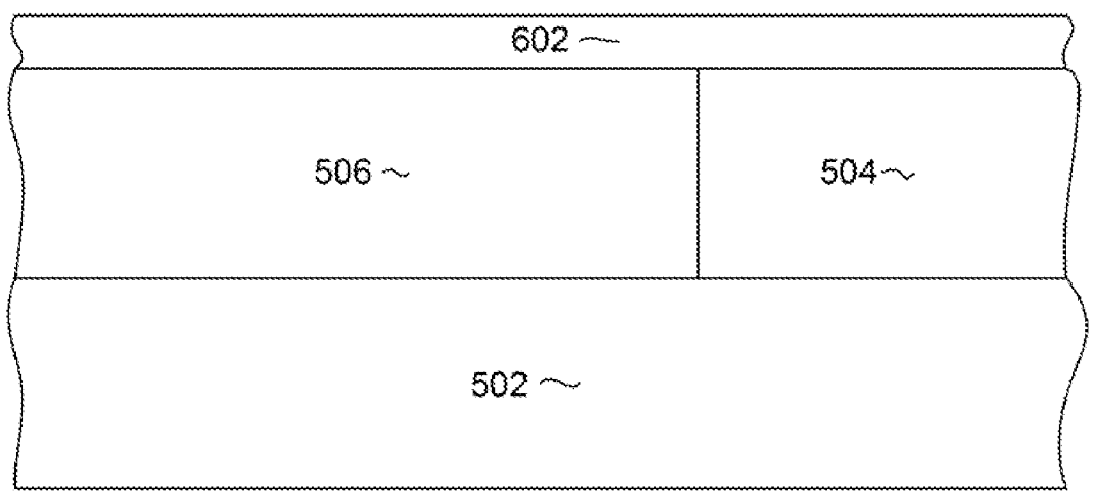
Figure 7:
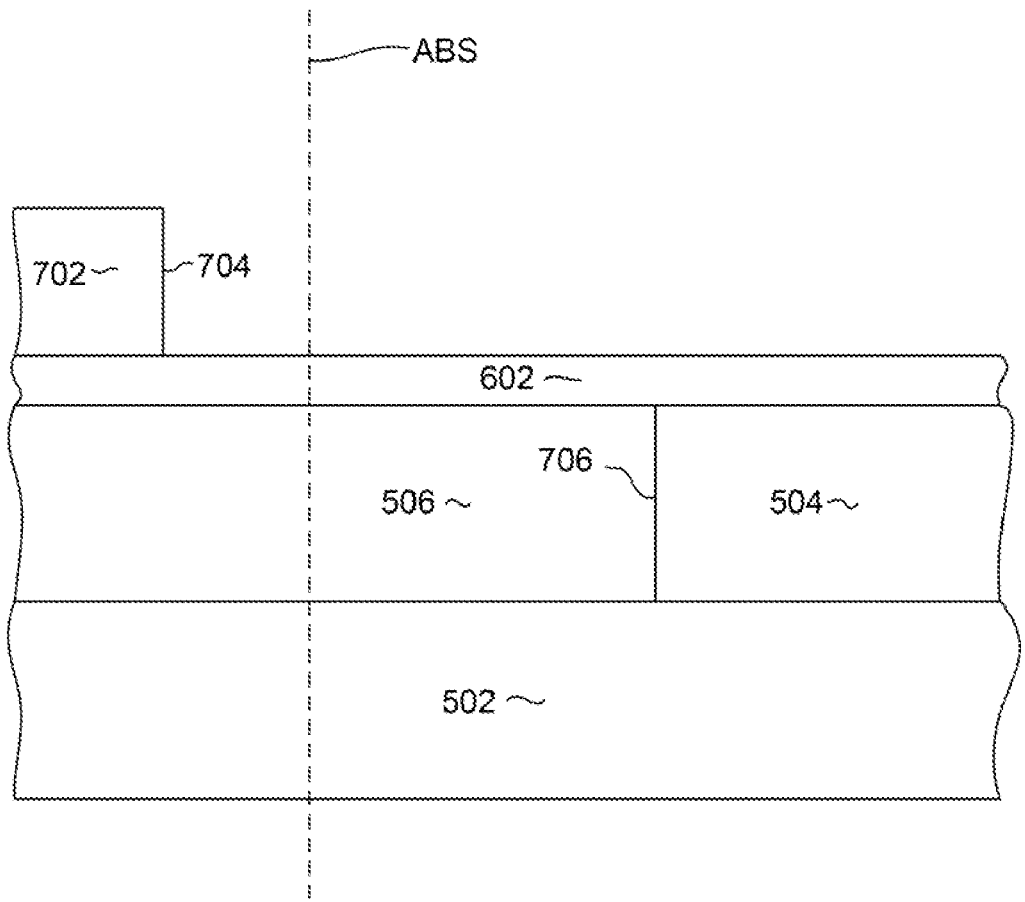

With reference now to FIG. 6, a non-magnetic material 602 such as alumina, Ru or NiC is deposited full film on top of the layers 506, 504. This non-magnetic material layer 602 can be deposited to a thickness of 70-130 nm or about 100 nm, for example. Then, with reference to FIG. 7, a photoresist mask 702 is formed over the non-magnetic layer 702. The photoresist mask 702 can be formed by depositing a full film of photoresist material, then photolithographically patterning and developing the photoresist material to form a mask 702 as shown. The mask 702 is formed to have a back edge 704 that is located at a desired location relative to the front edge 706 of the magnetic layer 504 (shaping layer 504) and also relative to an air bearing surface plane indicated by dashed line ABS.

Figure 8:
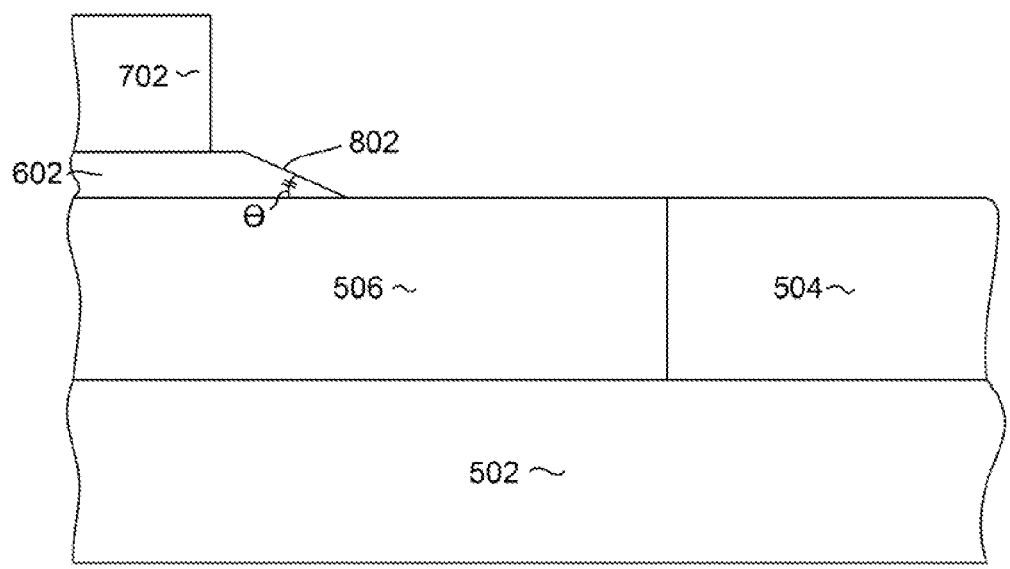

Then, with reference to FIG. 8 an ion milling is performed to remove a portion of the non-magnetic layer 602, while leaving a portion of the layer 602 that is protected by the mask. The ion milling is performed in such a manner that shadowing from the mask 702 causes the layer 602 to have a tapered or sloped portion 802. To this end, the ion milling is preferably performed at one or more angles that are chosen to form the slope 802. The sloped portion 802 preferably forms an angle □ of 20-30 degrees or about 25 degrees relative to the plane of the layers 506, 504, 502.

Figure 9:
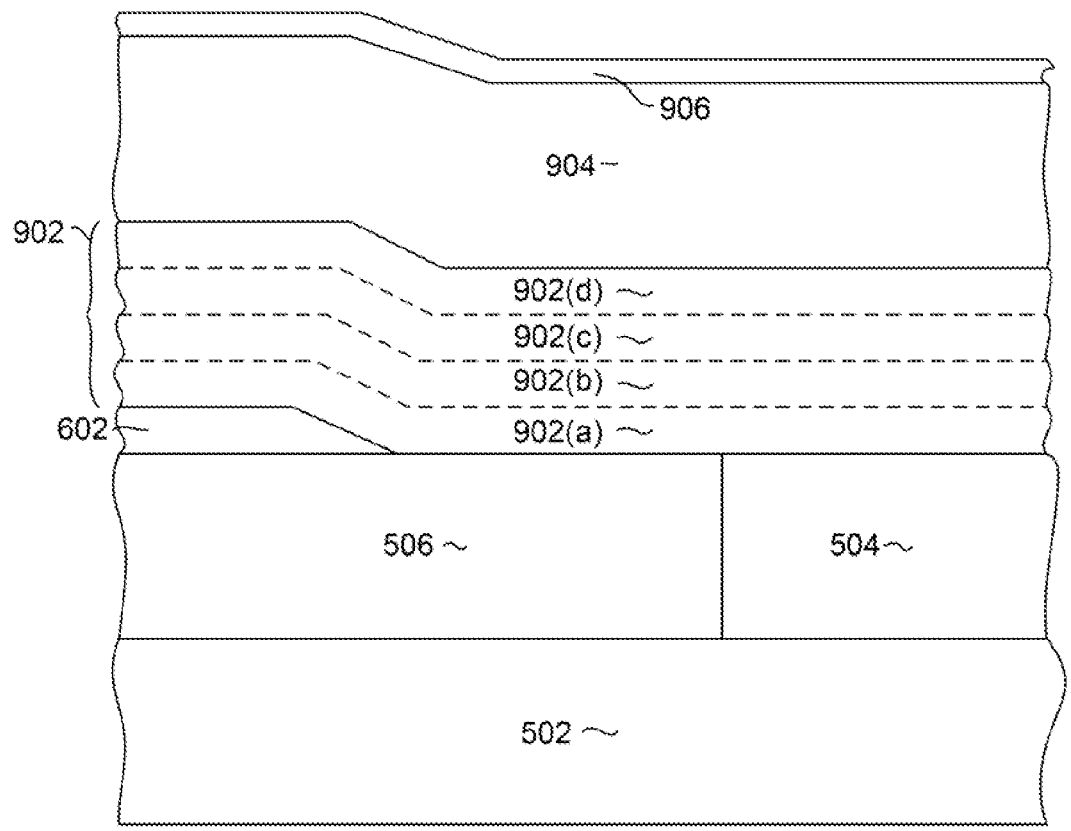

With reference now to FIG. 9, a magnetic write pole layer 902 is deposited. The magnetic write pole layer 902 can be deposited in several ways. For example, the write pole layer 902 can be sputter deposited layers 902(a-d) of a high moment material such as CoFe or NiFe, the layers being separated from one another by thin non-magnetic layers such as Cr or Ru (not shown). The layer 902 could also be a single layer of sputter deposited high magnetic moment material such as such as $Co_{30}Fe_{70}$ or $Co_{30}Fe_{65}Ni_5$. Alternatively, the layer 902 could be an electroplated layer of material such as CoFeNi.

Then, with continued reference to FIG. 9, a non-magnetic step layer 904 such as SiC is deposited over the magnetic write pole layer 902. The non-magnetic layer 904 is deposited fairly thick to provide a shadowing mask as will be described further below. To this end, the layer 904 can be deposited to a thickness of 180-280 nm or about 230 nm. A thinner layer of RIE mask material 902 is deposited over the non-magnetic layer 904. This layer 906 can be is a material that is resistant to reactive ion etching, such as Cr, and can be deposited to a thickness of 10-30 nm or about 20 nm.

It can be seen in FIG. 9, that the layers 902 are not planarized, such as by chemical mechanical polishing, prior to depositing the layers 904, 906. This advantageously saves many processing steps and avoids a great deal of process complexity, thereby improving through-put, reducing cost and increasing yield of the write heads produced. This ability to avoid this costly and complex planarizing step is made possible by process steps that will be described herein below.

Figure 10:
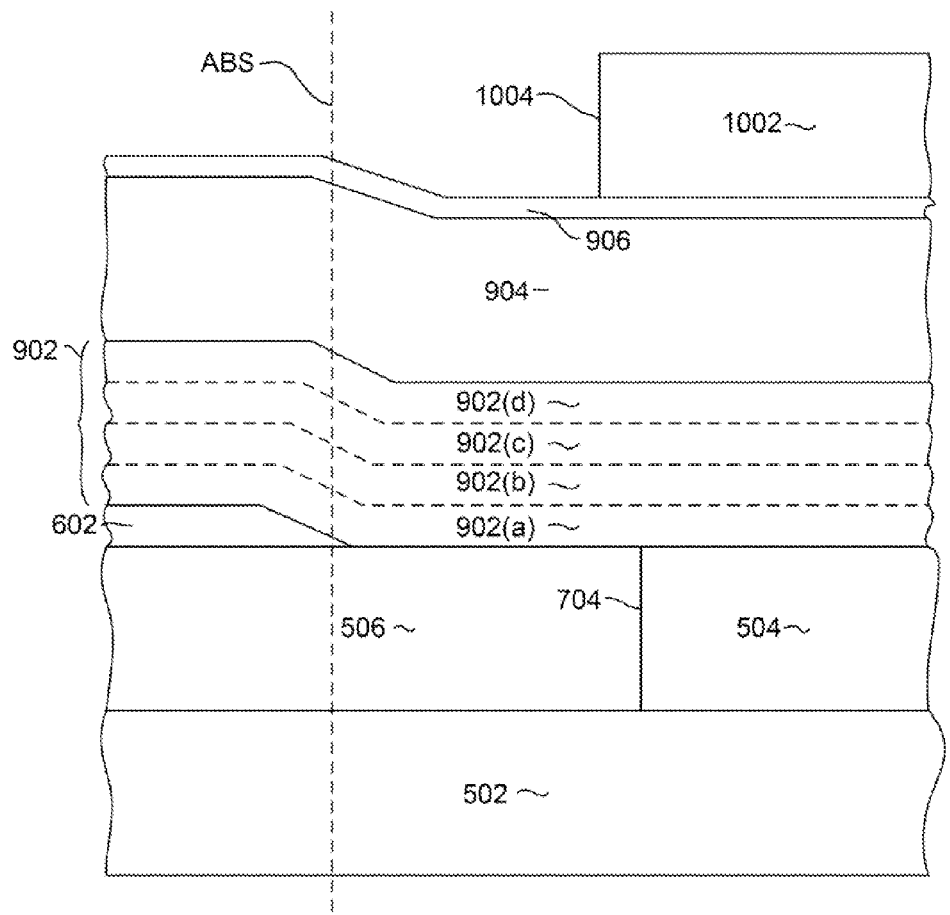
Figure 11:
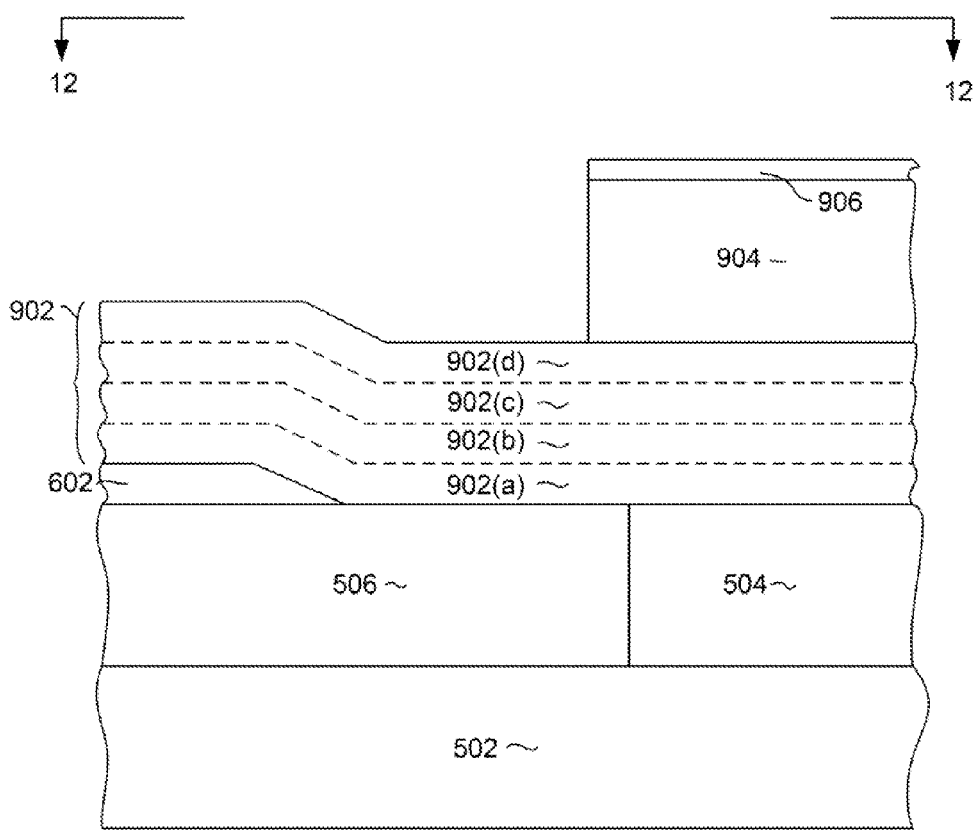
Figure 12:
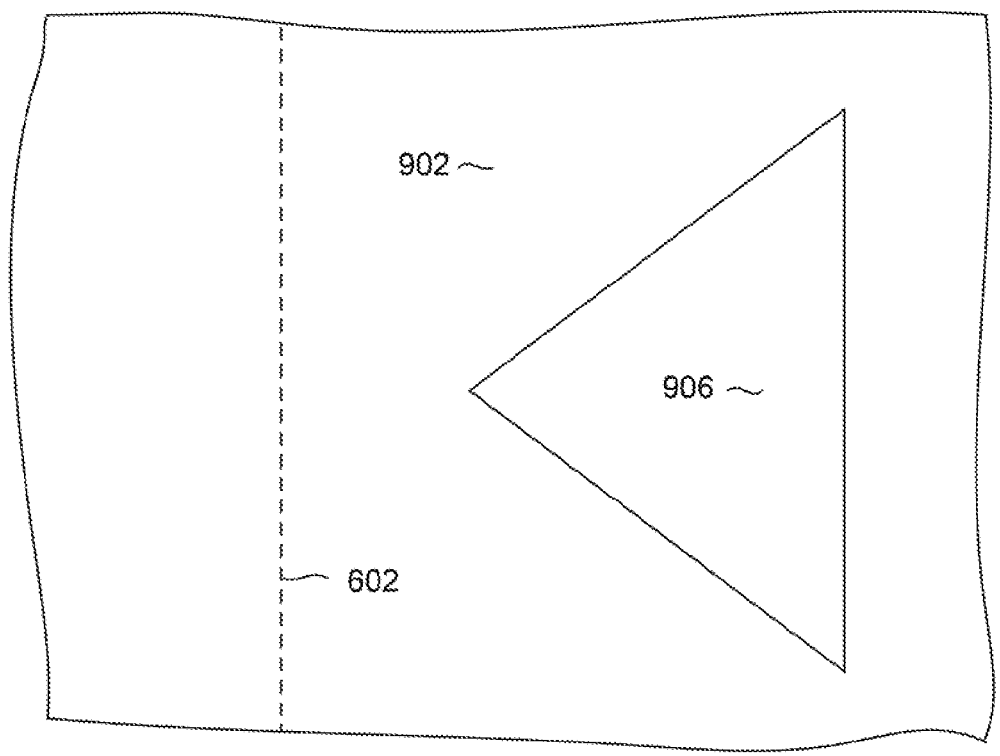

With reference now to FIG. 10, a photoresist mask 1002 is formed over the RIE mask 1002. The photoresist mask has a front edge 1004 that is located at a desired location relative to the front edge of the magnetic layer 504 and relative to the ABS plane. Then, a quick ion milling is performed to transfer the image of the photoresist mask 1002 onto the underlying mask layer 906. The photoresist mask 1002 can then be lifted off, and a reactive ion etching (RIE) can be performed to transfer the image of the RIE mask 906 onto the underlying non-magnetic layer 904, leaving a structure as shown in FIG. 11. FIG. 12 shows a top down view of the mask layers 906 (and 904 there-under) as viewed from line 12-12 of FIG. 11. In FIG. 12, the dashed line 602 indicates the location of the front edge of the non-magnetic bump 602 which is hidden beneath the magnetic write pole layer 902.

Figure 13:
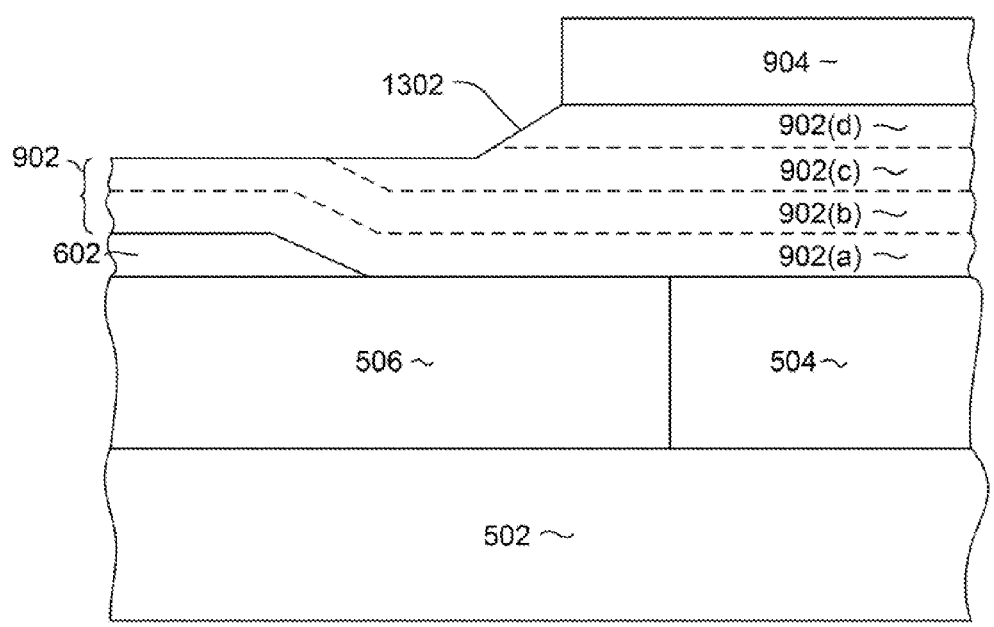

Then, with reference to FIG. 13, an ion milling process is performed to remove a portion of the magnetic write pole layer 902 to form a first tapered portion 1302 on the magnetic write pole layer 902. The ion milling is performed at one or more angles relative to normal so that shadowing from the non-magnetic layer 904 causes the angled ion milling to formed a tapered portion 1302 that defines a desired angle relative to the planes of the as deposited layers (i.e. relative to horizontal as shown in FIG. 13). This angle could be 20 to 30 degrees or about 25 degrees.

Figure 14:
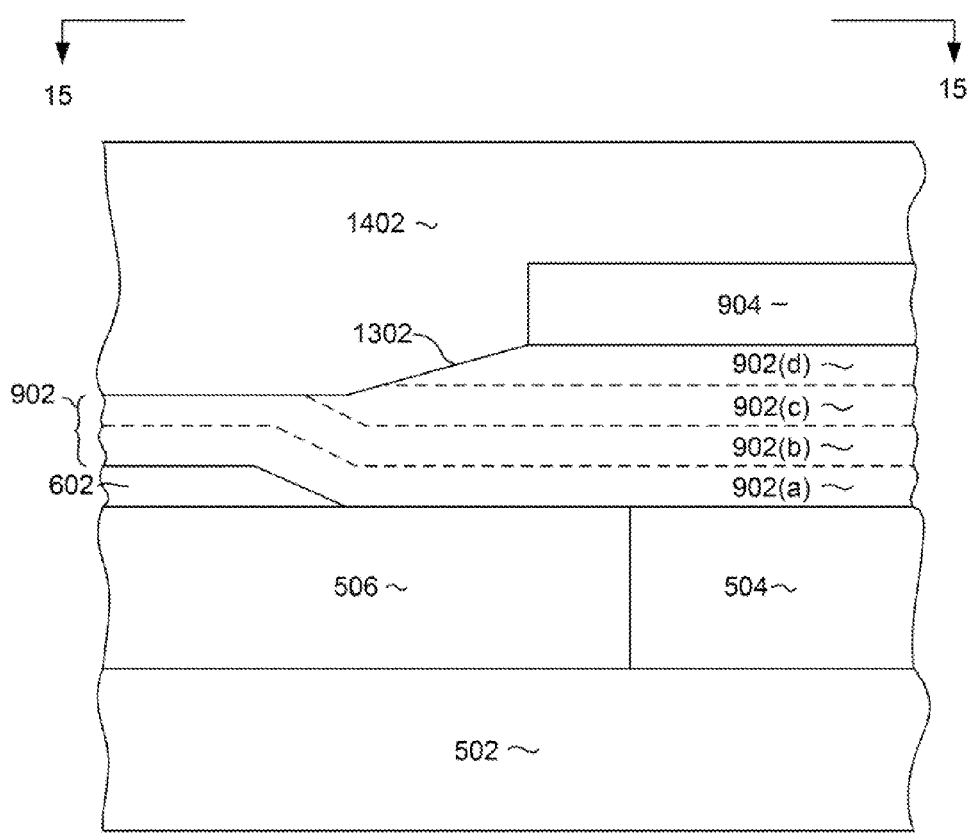

After the first taper has been formed, a masking and milling operation is performed to define the lateral dimensions of the write pole 902. With reference to FIG. 14, a mask structure 1402 is formed over the layers 902 and 904. The shape of this mask structure can be seen more clearly with reference to FIG. 15, which shows a top down view as seen from line 15-15 of FIG. 14.

Figure 15:
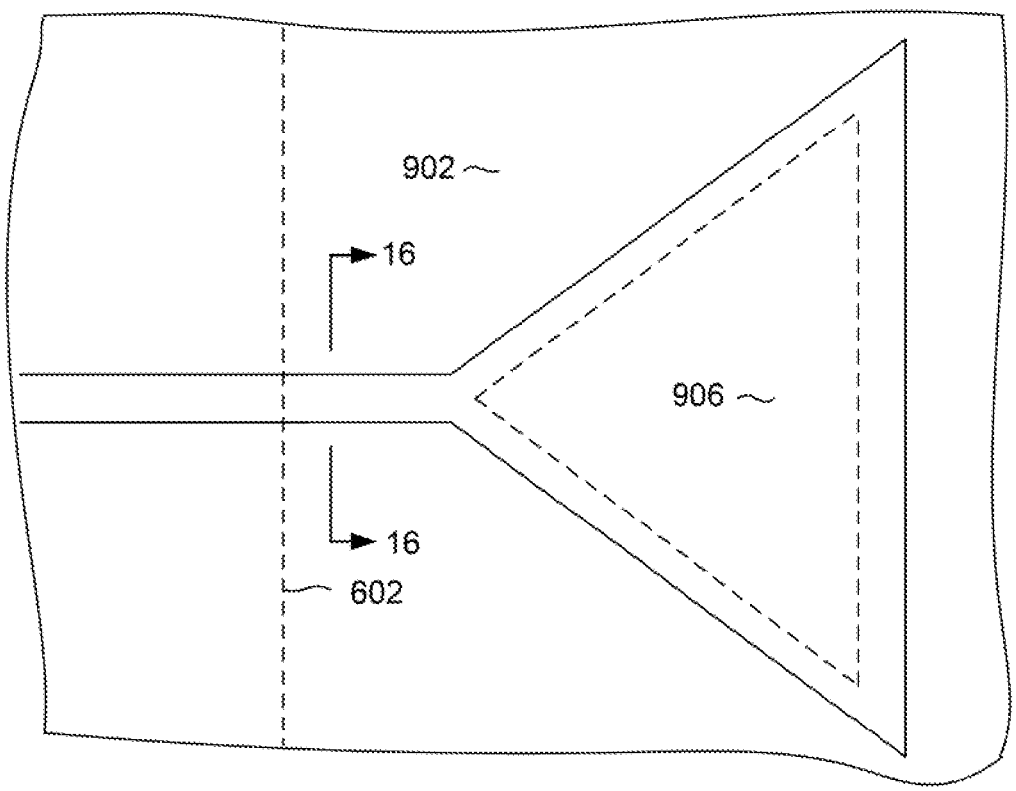
Figure 16:
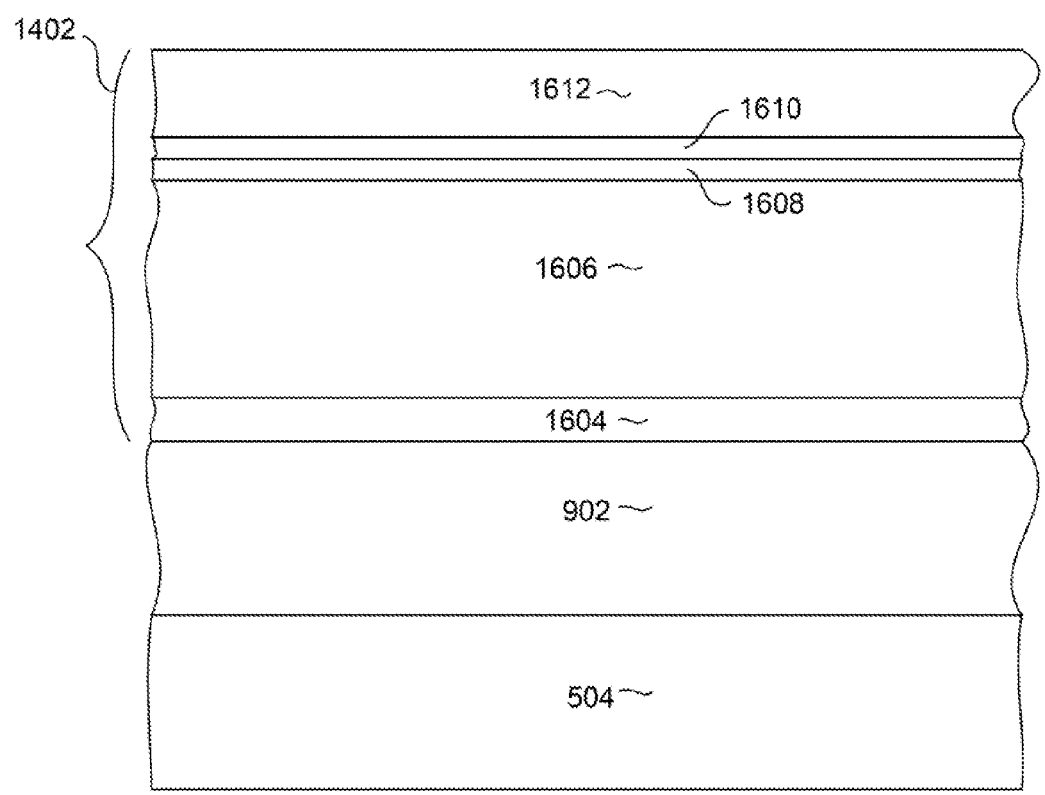
Figure 17:
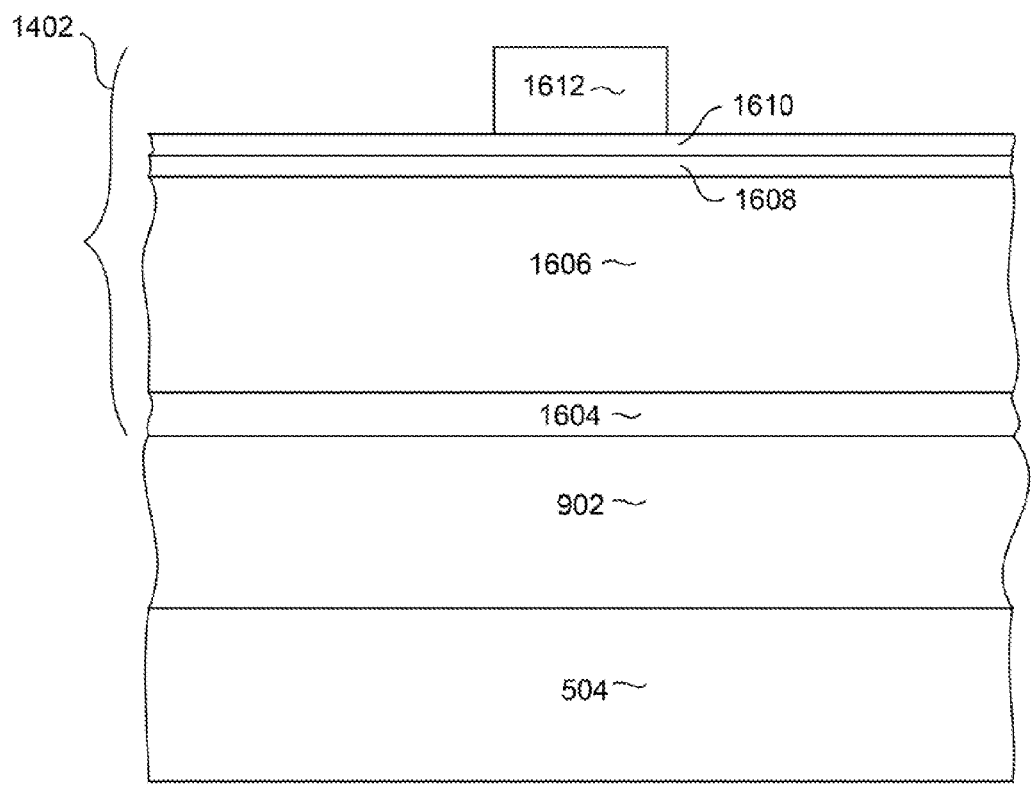
Figure 18:
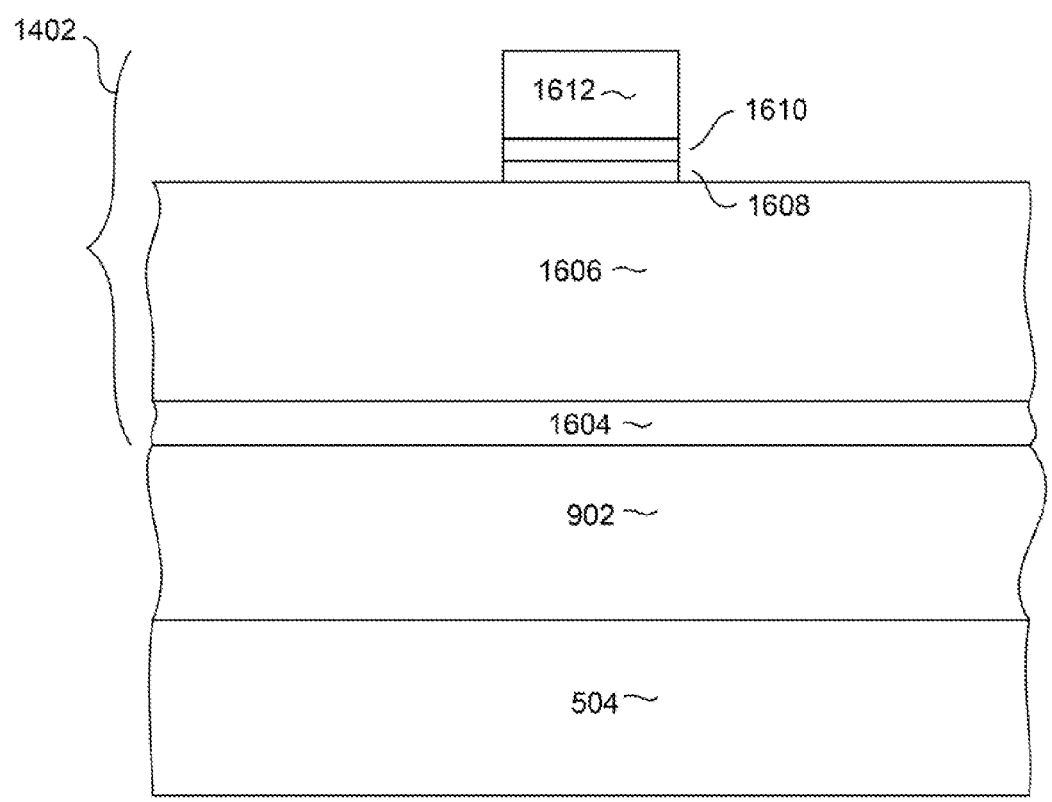
Figure 19:
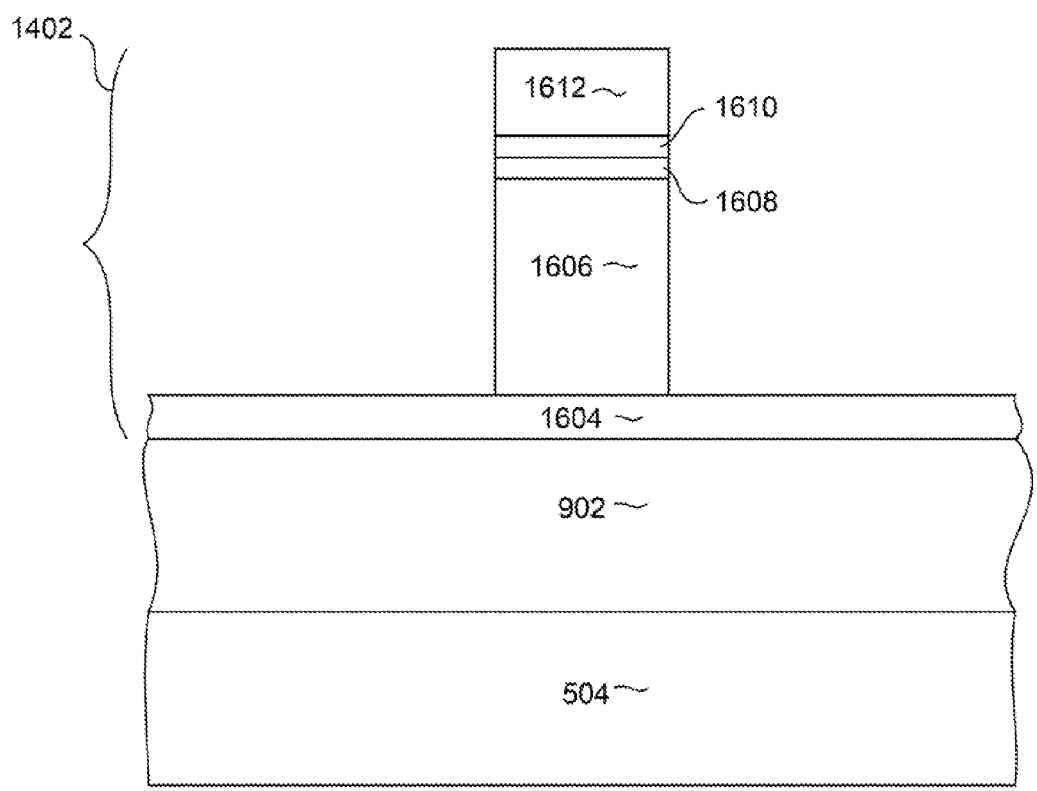
Figure 20:
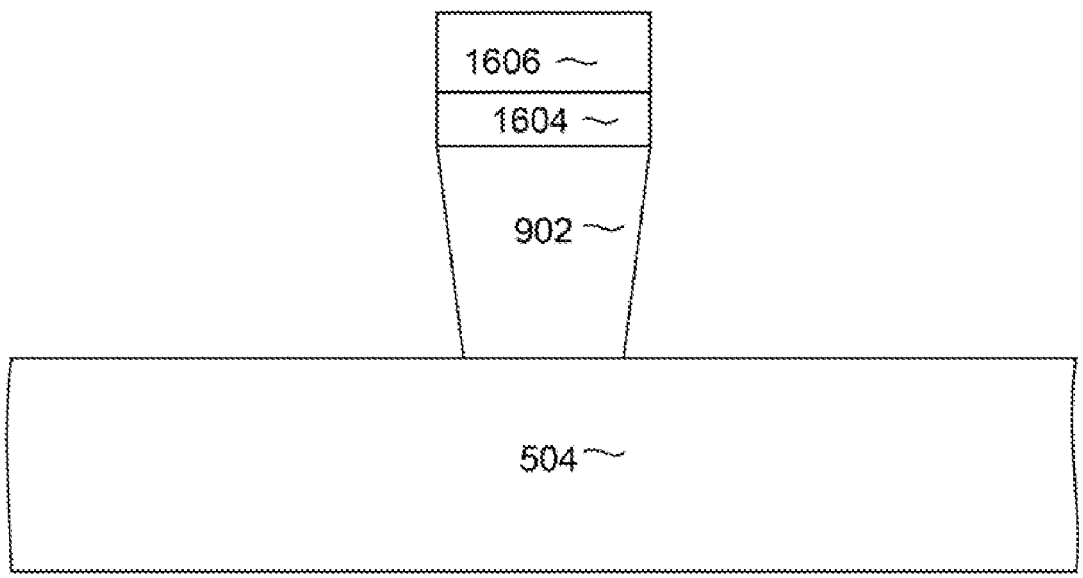

FIG. 16 shows a cross sectional view as seen from line 16-16 of FIG. 15. This view is taken at a constant cross-section pole tip region of the write-head and shows the mask structure 1402 in greater in greater detail. As seen in FIG. 16, the mask 1402 can include several masking layers, including a hard mask structure 1604 formed over the write pole material 902 at the bottom of the mask structure 1402. The hard mask layer 1604 can include one or more of alumina, Ta and carbon (such as diamond like carbon (DLC)). A thick layer of soluble polyimide material such as DURIMIDE® is deposited over the hard mask 1604. This layer 1606 serves as an image transfer layer that is sufficiently resistant to removal during ion milling to form the write pole (as will be seen below). To this end, the image transfer layer 1606 can be 1-1.2 microns thick (1000-1200 nm). A RIE mask 1608 can be deposited over the image transfer layer 1606. The RIE mask can be a material such as $SiO_2$ and can be about 120 nm thick. A Bottom Antireflective Coating (BARC) 1610 can then be deposited over the RIE mask 1608. The BARC layer can be constructed of a material such as DURIMIDE® (like the image transfer layer 1606) but is much thinner than the image transfer layer 1606. Finally, a layer of photoresist material 1612 is deposited over the BARC layer 1610. This photoresist layer 1612 is then photolithographically patterned and developed to form a photoresist mask shape such as is shown in cross section in FIG. 17. Then, a reactive ion etching is performed to transfer the image of the photoresist mask onto the underlying mask layer 1608. An ion milling can then be performed to transfer the image of the mask 1608 onto the underlying image transfer layer 1606, leaving a structure as shown in FIG. 19. Another ion milling operation is then performed, using the image transfer layer as a mask to define a write pole 902 having tapered sides as shown in FIG. 20.

Figure 21:
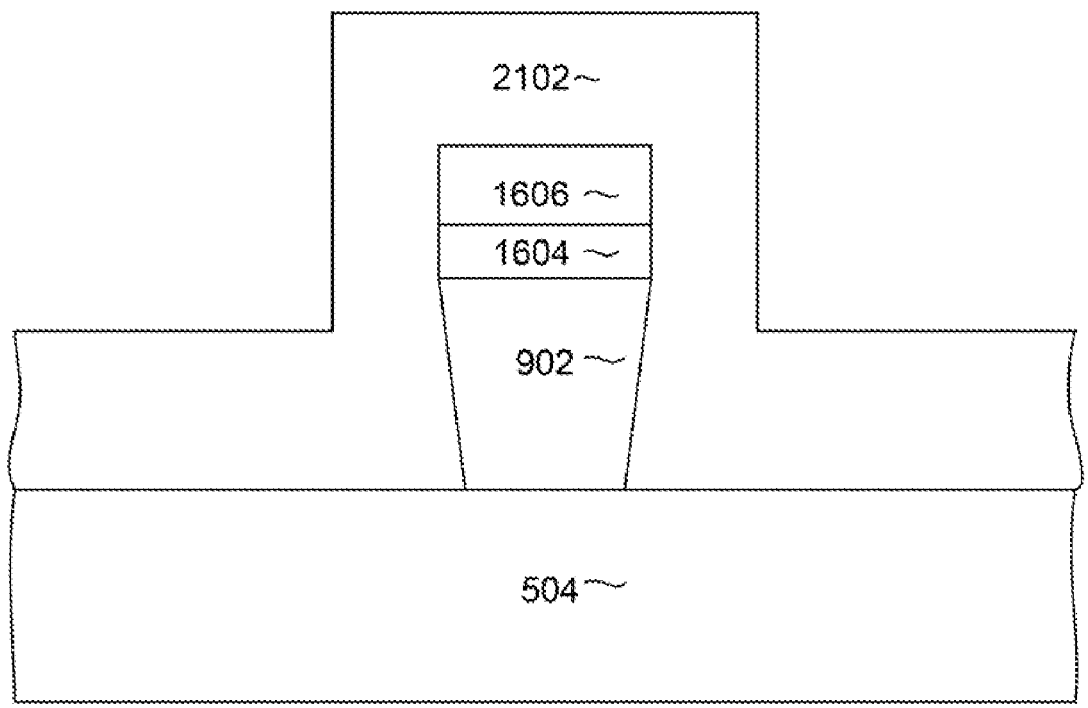
Figure 22:
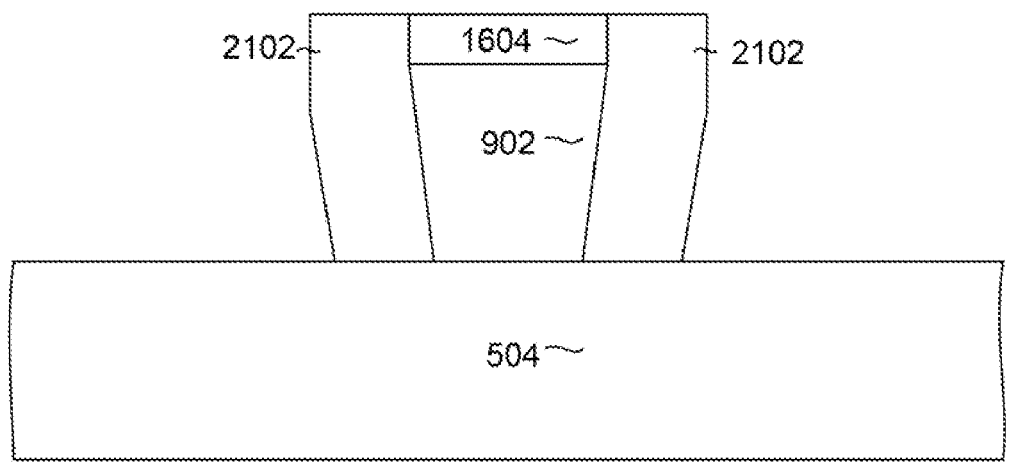
Figure 23:
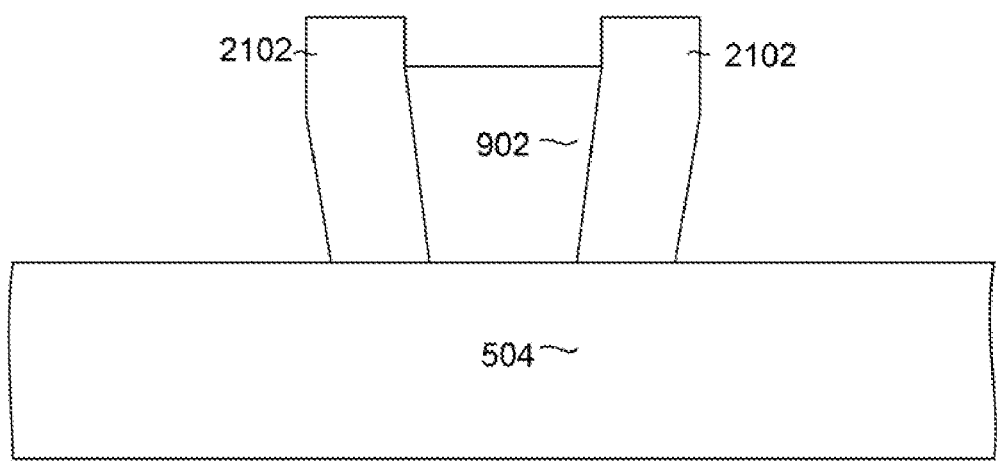
Figure 24:
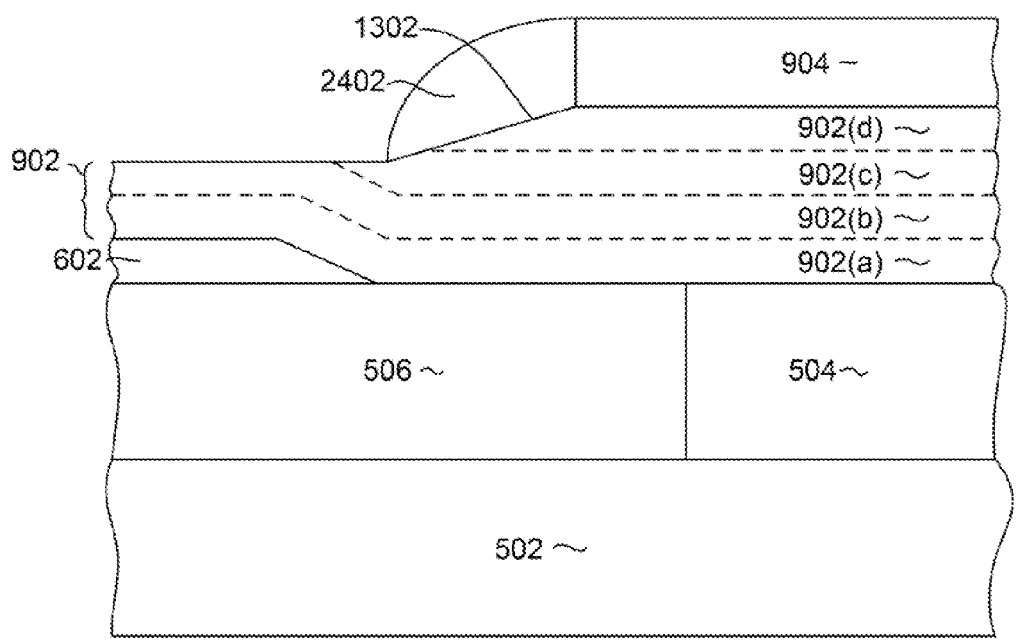
Figure 25:
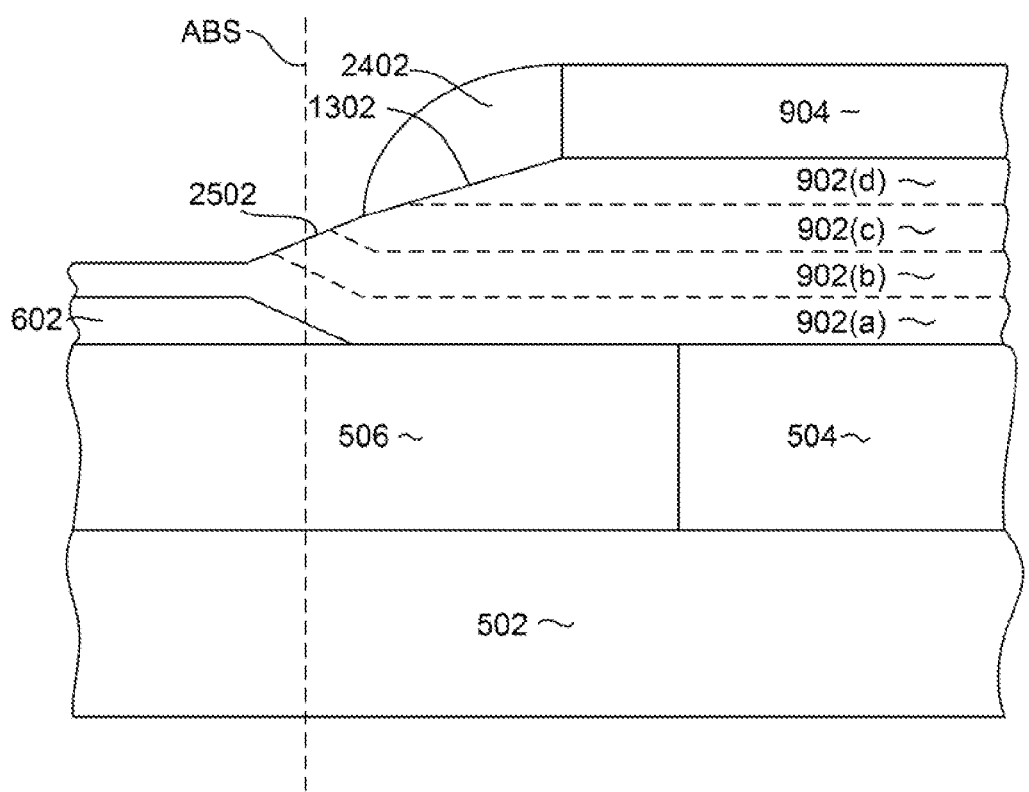

With reference now to FIG. 21, a relatively thick layer of non-magnetic material such as alumina 2102 is deposited over the substrate 504, write pole 902 and layers 1604, 1606. This alumina layer is preferentially deposited by atomic layer deposition (ALD). The remaining image transfer layer 1606 can optionally be removed prior to depositing the alumina layer 2102. Then, an ion milling or reaction ion milling can be performed to preferentially remove horizontally disposed portions of the alumina layer, leaving alumina side walls 2102 as shown in FIG. 22. The remaining mask layer 1604 can be removed, such as by reaction ion etching, to leave a structure as shown in FIG. 23. Optionally, all or a portion of the mask 1604 can be left intact to serve as all or a portion of a trailing gap layer. The ion milling used to form the alumina side walls (FIGS. 22, 23) also forms an alumina bump at the front edge of the non-magnetic layer 904 as shown in FIG. 24. This non-magnetic bump preferably extends substantially over the first tapered portion 1302 of the write pole material 902, stopping at the front end of the taper 1302 (at the point the taper ends and the surface of the write pole 902 tends to be more flat and horizontal).

Another ion milling is then performed to form a second tapered 2502 portion on the surface of the write pole 902. This tapered portion 2502 preferably extends beyond the air bearing surface plane (ABS), but depending on design requirements could be made to terminate short of the ABS plane. The ion milling process preferably includes one or more ion millings performed at one or more angles relative to normal so as to form the second tapered portion 2502 with a desired taper angle that is preferably 20-40 degrees or about 30 degrees relative to horizontal.

Figure 26:
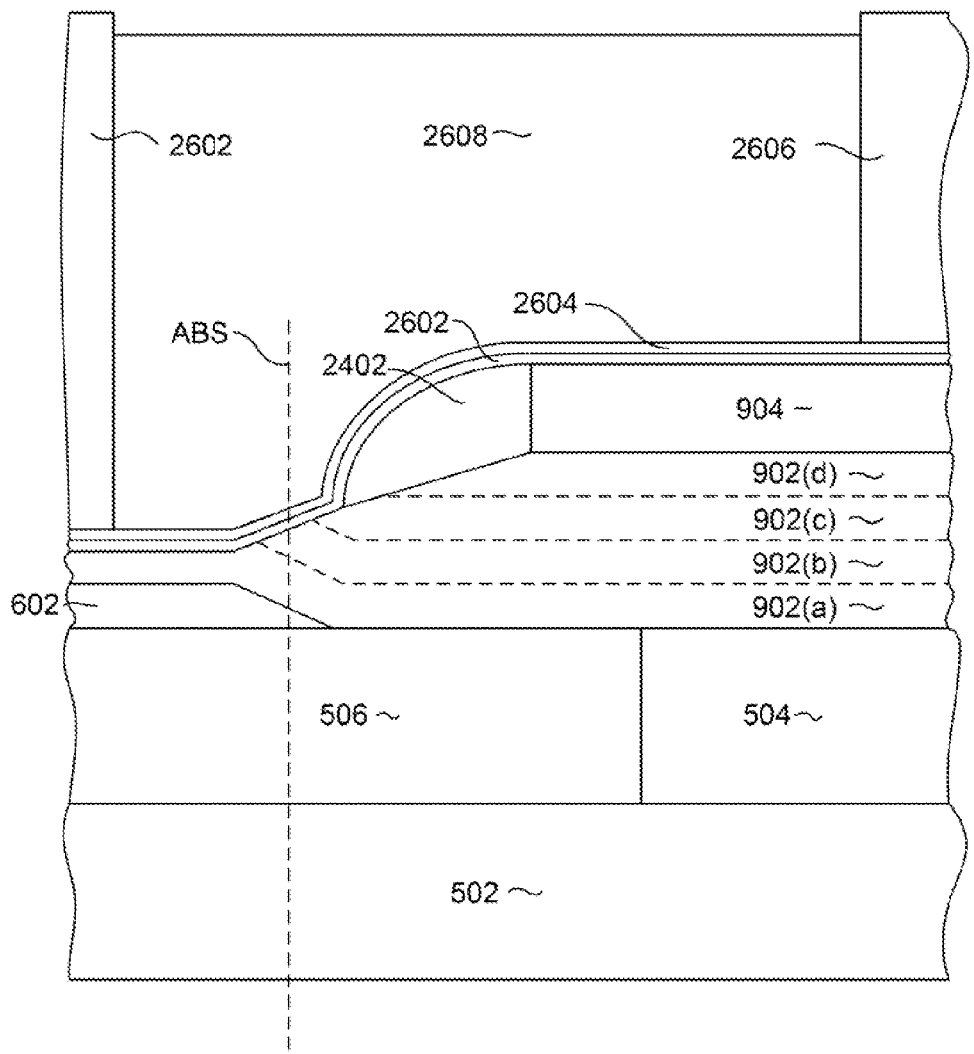

Then, with reference to FIG. 26, a non-magnetic seed layer can be deposited to form a trailing gap layer 2602. Then an electrically conductive seed electroplating seed layer 1604 can be deposited. An electroplating frame mask 1606 can then be formed having an opening configured to define a trailing, wrap-around magnetic shield. A magnetic material such as CoFe can then be electroplated into the opening to form a trailing, wrap-around magnetic shield 2608. If the trailing gap layer 2402 is deposited and is constructed of an electrically conductive material, this layer 2402 can serve as both a trailing gap layer and an electrically conductive plating seed, thereby eliminating the need for the separate seed layer 2602.

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method for manufacturing a magnetic write head, comprising:
    depositing a non-magnetic bump material over a surface;
    forming a first photoresist mask on the non-magnetic bump material;
    performing a first ion milling process to remove a portion of the non-magnetic bump material that is not protected by the first photoresist mask, the first ion milling process being performed at one or more angles relative to normal such that shadowing from the first photoresist mask forms a tapered back edge on the non-magnetic bump material and exposes a portion of the underlying surface;
    depositing a magnetic write pole material full film over the remaining non-magnetic bump portion and exposed portion of the surface;
    forming a non-magnetic step structure over the magnetic write pole material, the non-magnetic step structure having a front edge that is recessed from an air bearing surface plane; and
    performing a second ion milling to remove a portion of the write pole material, the second ion milling being performed in such a manner that shadowing from the non-magnetic step structure causes the ion milling to form a tapered portion on an upper surface of the write pole material.

2. The method as in claim 1 further comprising, after performing the second ion milling:
    forming a write pole defining mask structure over the magnetic write pole material and the non-magnetic step structure;
    performing a third ion milling process to remove portions of the write pole material that are not protected by the write pole defining mask structure, thereby defining a write pole structure;
    depositing a non-magnetic material over the write pole structure; and
    performing a fourth ion milling process to form non-magnetic side walls and forming a non-magnetic bump on the tapered portion of the upper surface of the write pole at the front edge of the non-magnetic step layer.

3. The method as in claim 2 further comprising, after performing the fourth ion milling, performing a fifth ion milling to remove a portion of the magnetic write pole material to form a second tapered portion on the upper surface of the magnetic write pole material.

4. The method as in claim 3 wherein the second tapered portion extends from the non-magnetic bump to a point beyond the air bearing surface plane.

5. The method as in claim 2 wherein the non-magnetic material deposited over the write pole structure comprises alumina.

6. The method as in claim 2 wherein the depositing a non-magnetic material over the write pole structure comprises depositing alumina by atomic layer deposition.

7. The method as in claim 2 wherein the fifth ion milling is performed in such a manner as to form the second tapered portion of the upper surface of the magnetic write pole structure with an angle of about 30 degrees relative to the planes of the as deposited layers.

8. The method as in claim 1 wherein the non-magnetic bump material comprises alumina, Ru or NiCr.

9. The method as in claim 1 wherein the non-magnetic bump material comprises alumina, Ru or NiCr and has a thickness of 70-130 nm.

10. The method as in claim 1 wherein the non-magnetic step structure comprises SiC, NiCr or Ru.

11. The method as in claim 1 wherein the non-magnetic step structure comprises SiC, NiCr or Ru and has a thickness of 180-280 nm.

12. The method as in claim 1 wherein the forming a non-magnetic step structure further comprises:
    depositing a non-magnetic step material layer;
    depositing a RIE mask layer over the non-magnetic step material;
    forming a photoresist mask structure over the RIE mask;
    performing an ion milling to transfer the image of the photoresist mask onto the underlying REI mask layer; and
    performing a reactive ion milling to transfer the image of the RIE mask onto the underlying non-magnetic step layer.

13. The method as in claim 12 wherein the RIE mask comprises Cr.

14. The method as in claim 12 wherein the RIE mask comprises Cr and the non-magnetic step material layer comprises Sic, NiCr or Ru.

15. The method as in claim 1 wherein the first ion milling process is performed in such a manner as to form a the tapered back edge of the non-magnetic bump with an angle of about 25 degrees relative to the planes of the as deposited layers.

16. The method as in claim 1 wherein the second ion milling is performed in such as manner as to form the tapered portion of the upper surface of the write pole with an angle of about 25 degrees relative to the planes of the as deposited layers.

17. The method as in claim 1 wherein the magnetic write pole layer comprises sputter deposited layers of CoFe or NiFe separated by thin layers of Cr, Ru or NiCr.

18. The method as in claim 1 wherein the magnetic write pole material comprises a sputter deposited layer of $Co_{30}Fe_{70}$ or $Co_{30}Fe_{65}Ni_5$.

19. The method as in claim 1 wherein the magnetic write pole material comprises an electroplated layer of CoFeNi.

20. The method as in claim 1 wherein the magnetic write pole material is not planarized by chemical mechanical polishing.

* * * * *